(12) United States Patent
Lin et al.

(10) Patent No.: US 6,328,393 B1
(45) Date of Patent: Dec. 11, 2001

(54) PIGMENT INK JET COMPOSITIONS FOR HIGH RESOLUTION PRINTING

(75) Inventors: John Wei-Ping Lin, Webster; Gary R. Fague, Canandaigua, both of NY (US); Raymond R. Wong, Mississauga (CA)

(73) Assignee: Xerox Corporation, Stamford, CT (US)

( * ) Notice: Subject to any disclaimer, the term of this patent is extended or adjusted under 35 U.S.C. 154(b) by 18 days.

(21) Appl. No.: 09/699,428

(22) Filed: Oct. 31, 2000

Related U.S. Application Data

(60) Division of application No. 08/810,841, filed on Mar. 4, 1997, now Pat. No. 6,143,807, which is a continuation-in-part of application No. 08/483,769, filed on Jun. 7, 1995, now abandoned.

(51) Int. Cl.[7] .................. B41J 2/02; B41J 2/135
(52) U.S. Cl. .................. 347/1; 347/73; 523/161; 106/31.65; 106/31.87; 106/31.89
(58) Field of Search .................. 523/161; 347/1, 347/73; 106/31.65, 31.87, 31.89

(56) References Cited

U.S. PATENT DOCUMENTS

| | | |
|---|---|---|
| 2,360,859 | 10/1944 | Evans et al. . |
| 2,578,565 | 12/1951 | Mahan et al. . |
| 4,251,824 | 2/1981 | Hara et al. . |
| 4,410,899 | 10/1983 | Haruta et al. . |
| 4,412,224 | 10/1983 | Sugitani . |
| 4,463,359 | 7/1984 | Ayata et al. . |
| 4,530,961 | 7/1985 | Nguyen et al. . |
| 4,532,530 | 7/1985 | Hawkins . |
| 4,601,777 | 7/1986 | Hawkins et al. . |
| 4,627,875 | 12/1986 | Kobayashi et al. . |
| 4,840,674 | 6/1989 | Schwarz . |
| 5,085,698 | 2/1992 | Ma et al. . |
| 5,100,469 | 3/1992 | Pontes et al. . |
| 5,169,437 | 12/1992 | You . |
| 5,180,425 | 1/1993 | Matrick et al. . |
| 5,205,861 | 4/1993 | Matrick . |
| 5,207,825 | 5/1993 | Schwarz, Jr. . |
| 5,223,026 | 6/1993 | Schwarz, Jr. . |
| 5,281,261 | 1/1994 | Lin . |
| 5,356,464 | 10/1994 | Hickman et al. . |
| 5,389,133 | 2/1995 | Gundlach et al. . |
| 5,648,405 | 7/1997 | Ma et al. . |
| 5,693,129 | 12/1997 | Lin . |
| 5,833,744 | 11/1998 | Breton et al. . |

*Primary Examiner*—Tae H. Yoon
(74) *Attorney, Agent, or Firm*—Oliff & Berridge, PLC

(57) ABSTRACT

An aqueous ink jet ink composition having a pigment wherein at least 50% of the pigment particles have an average diameter or size $\leq 0.3$ microns with the remaining particles in the ink composition having a diameter or size $\leq 3.0$ microns, water, a dispersant which is a reaction product of an aldehyde and a naphthalene sulfonate salt, and/or a sulfone solvent. The aqueous ink jet ink possesses a latency of at least 10 seconds at a relative humidity of 15% in either a high resolution (>360 spi) printhead or full-width array printhead having at least one nozzle opening of a diameter or size ranging from 10 to about 49 microns.

11 Claims, No Drawings

PIGMENT INK JET COMPOSITIONS FOR HIGH RESOLUTION PRINTING

This is a division of application Ser. No. 08/810,841 filed Mar. 4, 1997, now U.S. Pat. No. 6,143,807 which in turn is a Continuation-In-Part of application Ser. No. 08/483,769 filed Jun. 7, 1995, now abandoned. The entire disclosure of the prior applications is hereby incorporated by reference herein in its entirety.

FIELD OF THE INVENTION

The present invention is directed to aqueous ink compositions. More specifically, the present invention is directed to pigmented aqueous ink compositions particularly suitable for use in ink jet printing processes.

BACKGROUND

Ink jet printing is a non-impact method that produces droplets of ink that are deposited on a substrate such as paper or transparent film in response to an electronic digital signal. Thermal or bubble jet drop-on-demand ink jet printers have found broad application as output for personal computers in the office and the home.

In existing thermal ink jet printing, the printhead typically comprises one or more ink jet ejectors, such as disclosed in U.S. Pat. No. 4,463,359, and each ejector includes a channel communicating with an ink supply chamber, or manifold, at one end and an opening at the opposite end, referred to as a nozzle. A thermal energy generator, usually a resistor, is located in each of the channels at a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is a very temporary phenomenon, and the ink is quickly propelled toward a print substrate. As the bubble begins to collapse, the ink still in the channel between the nozzle and bubble starts to move towards the collapsing bubble, causing a volumetric contraction of the ink at the nozzle and resulting in the separation from the nozzle of the bulging ink as a droplet. The acceleration of the ink out of the nozzle while the bubble is growing provides the momentum and velocity for propelling the ink droplet in a substantially straight line direction towards a print substrate, such as a piece of paper. Because the droplet of ink is emitted only when the resistor is actuated, this type of thermal ink-jet printing is known as "drop-on-demand" printing. Thermal ink jet processes are well known and are described in, for example, U.S. Pat. Nos. 4,601,777, 4,251,824, 4,410,899, 4,412,224, 4,532,530, and 5,281,261, the disclosures of which are totally incorporated herein by reference. Other types of ink-jet printing, such as continuous-stream or acoustic, are also known.

In an ink jet printing apparatus, the printhead typically comprises a linear array of ejectors, and the printhead is moved relative to the surface of the print sheet, either by moving the print sheet relative to a stationary printhead, or vice-versa, or both. In some types of apparatuses, a relatively small ink jet printhead moves across a print sheet numerous times in swathes to form a line image. A partial (e.g. checkerboard) or a desired line image can be produced on the print sheet in each swath. After each line image is completed, the print sheet is advanced and the process is repeated until the entire image is printed. This type of ink jet printing is known as multiple pass (multi-pass) printing or checkerboard printing.

In some cases, an array of ejectors is formed by butting together several printheads, forming a printhead bar. This increases the number of ink jet nozzles so that the printing speed can be increased. The length of the printhead bar may cover only a part of the width of the print substrate. This type of ink jet printhead is called a partial-width printhead. The partial-width printhead can be used in the aforementioned multiple pass printing or checkerboard printing with increased print speed.

Alternatively, a printhead which consists of an array of ejectors and extends to the full width of the print substrate may be used. Ink can be deposited onto the print substrate one line at a time by the full-width array printhead until full-page images are completed. This is called a single pass method of printing. The ink jet printer which uses one or more full-width array printheads is known as a "full-width array" (FWA) printer. When the full-width array printhead and the print substrate are moved relative to each other, image-wise digital data is used to selectively activate the thermal energy generators in the printhead over time so that the desired image will be created on the print substrate. Several full-width array ink jet printheads can be employed in a multi-color ink jet printing system.

With the demand for higher resolution printers, the nozzles of printheads, partial-width printheads and full-width array printheads in ink jet printers are decreasing in size. Nozzle openings are typically about 50 to 80 micrometers in diameter or size for 300 spot per inch (spi) printers. With the advent of high resolution (e.g., >360 spi, including 400 spi and 600 spi) printers, these nozzle openings in a printhead are typically about 10 to about 49 micrometers in diameter or size. These high resolution printheads, partial-width printheads, and full-width array printheads with small nozzle dimensions or sizes require special inks that do not easily clog the small openings. These special inks are more difficult to make than the ink jet inks used in low resolution printheads (e.g. $\leq 360$ spi), which have less stringent requirements.

One of the critical requirements for an ink jet ink is the ability of the ink to remain in a fluid and jettable condition in a printhead opening which is exposed to air. Latency is the maximum idling time that still allows a printhead to function without failure at 15% relative humidity (RH), jetting an ink with a speed $\geq 5$ m/s (equivalent to an ink traveling a distance of 0.5 mm in $\leq 100$ microseconds) after a period of non-use or idling. Long latency is required in order to reduce maintenance of the printhead, especially when there are some infrequently utilized nozzles. A major concern with all ink jet printheads is plug formation or clogging of nozzles, both during operation and between operations of the ink jet printhead. Plug formation is caused by evaporation of water or an organic solvent from the opening of the nozzle. In dye-based inks, this can cause crystallization or precipitation of soluble components such as dye or solid additives as well as an increase in the viscosity of the ink composition. In pigment based inks, this evaporation can cause precipitation of the pigment particles, flocculation or aggregation of the pigment particles, or precipitation of solid ink additives, as well as an increase in the viscosity of the ink composition.

Initial evaporation generally causes an increase in viscosity which affects the ability of the printhead to fire a drop of ink through a nozzle. Some additives have been developed which reduce the rate of evaporation from the ink. However, these additives do not totally eliminate the problem of evaporation from the ink, and, thus, clogging of the nozzles remains a problem, especially with regard to pigment based inks and printheads with small nozzle openings.

The inception of plug formation may cause distortion of the image or alphanumeric characters. This may appear as a drop of ink which is displaced from its intended position. Sometimes two ink drops will be formed equally spaced from the intended target position. Sometimes small numerous satellite drops are produced. On some occasions, the drop may even reach its intended position but at a lower drop volume, producing a lower optical density image. Ultimately, the plugged nozzle will fail to fire and no image will be generated.

Ink jet printers are normally designed to prevent excessive evaporation of water and humectant or solvent from printhead nozzles by sealing the printhead in an air-tight chamber when not in use. These devices may become ineffective with continued printer use because dried ink deposits can be formed at the front face of a printhead and on the rubber seals, causing the system to lose its air-tight condition. However, the system may still be used in an ink jet printer to slow down ink evaporation at the printhead nozzles. Another device used to prevent clogging of the nozzle is a flexible wiper that removes solids formed near or at the opening surface of a printhead nozzle. This device provides necessary printhead cleaning, but it alone may also be ineffective because of the depth of the plug or because of the hardness of the plug, which may be sufficient to resist mechanical removal. Another method of removing ink nozzle clogging is the use of forced air or vacuum suction to clear any deposits from the nozzle. Although these devices may be inefficient and add considerable expense to the cost of the printer, they are sometimes useful for cleaning ink jet printheads.

Another commonly used method to avoid the problem of clogging is to clear the nozzle by firing the printhead in a non-image mode, e.g., into an ink collection receptacle. While this solution is an effective remedy, it requires that the ink form a soft or non-cohesive plug for easy removal. To make this non-image clearance process effective, the surface of the ink in the nozzle must be mechanically or cohesively weak for easy jetting or ink removal. Such a process is set forth in U.S. Pat. No. 5,205,861 to Matrick.

Though periodic firing of ink in an ink jet printhead for maintenance purposes is well known, frequent firing can cause significant loss of valuable ink, thereby raising costs. Therefore, there is a need to develop an ink jet ink which requires less frequent maintenance procedures such as wiping, suction, and ink firing.

Another important requirement for ink jet inks, especially for pigment based inks, is for the pigment particles to remain stable and uniformly dispersed in the ink throughout the life of the ink jet cartridge. Dye-based ink jet inks suffer from deficiencies in water fastness, smear resistance and light fastness after being printed on various substrates. Pigment-based ink jet inks provide an image on a wide variety of substrates, having high optical density and sharp edges with very good water fastness, smear resistance and light fastness. Therefore, pigments are a preferred alternative to dyes in an ink jet ink, provided the pigment particle dispersions can be made stable to prevent undesired flocculation and/or aggregation and settling. Some co-solvents that are good as clogging inhibitors may cause destabilization of pigment particle dispersions and, therefore, cannot be used in pigmented inks. Therefore, proper selection of a desired solvent or humectant for a pigmented ink is extremely important. This is particularly true for a pigmented ink which is used in a high resolution printhead. Thus, there is a need to obtain desired humectants and solvents for pigmented inks with improved stability and jetting performance.

Great effort has been made in attempts to provide ink jet inks having high pigment or pigment and dye loading with acceptable latency and stability, which are required for proper jetting of the ink jet ink composition. However, inks having all of the above-mentioned desirable characteristics have not been easily obtained. Many commercial pigment inks are not stable and form aggregations or precipitations, causing clogging of the printhead. Unstable pigment inks usually have poor latency and jetting performance. However, many dye based inks are claimed to have good properties and performance. For example, U.S. Pat. No. 4,840,674 to Schwarz describes an ink jet ink having sulfolane in combination with dyes and other ink additives without pigments. U.S. Pat. No. 5,169,437 to You discloses water based dye ink compositions exhibiting reduced crusting, clogging and kogation. The subject matter of these patents is incorporated herein by reference.

Moreover, certain ink jet printers require ink jet inks having higher loading of pigments to provide sufficient optical density in a single pass printing method, i.e., without applying additional ink to the substrate or paper using two or more passes. Additionally, certain ink jet printheads in printers are designed to provide enhanced resolution such as, for example, a printhead capable of jetting inks at 400 or 600 spi, as compared to the currently used 300 spi printheads in many commercial ink jet printers. These novel high resolution ink jet printing devices require specially refined inks that do not cause clogging or plugging of the ink jet nozzles, which are significantly narrower than those of $\leq 360$ spi printheads. In particular, nozzle openings are typically about 50 to 80 microns in diameter or size for $\leq 360$ spi printheads, and about 10 to 49 microns in diameter or size for >360 spi printheads. Because of the narrower nozzle opening diameters or sizes of high resolution ink jet printers, it is easier for the nozzles to clog. Therefore, there is a need to develop newly advanced inks to address the problem.

Some of the commercial ink jet inks, such as the HP 1200C black ink and Lexmark 1361400 waterproof black ink do not use a dispersant such as a polymer of an aldehyde derivative and a naphthalene sulfonate salt. Further, they contain reasonably low amounts of pigment, having a pigment loading of about 3–5% by weight or less, and produce an optical density $\leq 1.0$ on some plain papers in a single ink application. Therefore, they require multiple passes to form images with low resolution ($\leq 360$ spi) printers. These inks are stable, but do not provide a sufficiently high optical density or the needed latency in a single pass method for high resolution (>360 spi) and high speed printing on various substrates, possibly due to low ink coverage, small ink spot size, and inadequate ink/printhead compatibility.

Efforts to increase pigment loading of ink jet inks using commercial pigments and pigment dispersions sometimes have resulted in improperly processed inks having undesirable instability (increased agglomeration or flocculation). Moreover, the decap time or latency of such inks in a high resolution printhead is often very low (usually $\leq 10$ seconds). Likewise, many commercial ink jet inks (e.g. HP 1200C carbon black and cyan dye inks), which are useful for $\leq 360$ spi ink jet printing, have a short latency ($\leq 10$ sec.) when they are used in conjunction with a high resolution (>360 spi) printhead with a nozzle opening diameter or size ranging from about 10 to 49 microns. Accordingly, such inks are not suitable for high resolution ink jet printers because they do not have proper jetting characteristics. Further, many ink jet ink compositions used for low resolution or slow speed printing have an undesired particle size distribution or large pigment particles (>3.0 microns) which are unstable and can cause clogging of the smaller printhead nozzles used in high resolution or high speed printing.

Thus, there is a need in the art for developing new aqueous ink jet ink compositions that can be utilized in high resolution printheads for ink jet printers. Additionally, there is a need for pigmented inks that provide long latency and also remain stable throughout the life of the ink jet printing cartridge. There is a further need for pigmented inks which have good waterfastness, proper particle size and stable pigment particle dispersions which do not cause undesirable nozzle clogging. There is also a need for pigmented inks that can provide high optical density for printing in both single pass (for high speed printing) and multiple pass methods.

Furthermore, there is a need to provide pigmented inks which are capable of printing at high speed or high resolution with a high jetting frequency response, for example, greater than 2.0 KHz, and preferably greater than 3.0 KHz.

SUMMARY OF THE INVENTION

The present invention relates to an aqueous pigment ink jet ink composition comprising a pigment having a pigment particle size distribution where at least 50% of the pigment particles have an average diameter or size $\leq 0.3$ microns with the remaining particles in the ink composition having a diameter or size $\leq 3.0$ microns, preferably $\leq 1.2$ microns, with a portion of the particles having a diameter or size $\geq 0.1$ micron and $\leq 3.0$ microns, preferably $\leq 1.2$ microns, a dispersant which is the product of an aldehyde (e.g., formaldehyde, acetaldehyde, etc.) and a naphthalene sulfonate salt (for example, a naphthalene sulfonic acid salt or an alkyl substituted naphthalene sulfonic acid salt or an alkyl ether substituted naphthalene sulfonic acid salt with various cations, including $Rb^+$, $Cs^+$, $K^+$, $Na^+$, $Li^+$, and substituted and unsubstituted ammonium cations), water, and optional ink additives including humectants or solvents, jetting aids, biocides, pH buffering agents, anti-cockling agents, anti-curl agents, and polymers. The above ink jet ink composition can also contain at least one water soluble sulfone or sulfoxide solvent in addition to or in place of the dispersant.

The present invention also relates to a high resolution ink jet printing process comprising application of an ink jet ink in an image-wise fashion onto a print substrate. The ink jet ink composition comprises water, a pigment dispersion and at least one water soluble solvent or humectant. The ink jet ink possesses a latency of at least greater than 10 seconds in a printhead having at least one nozzle of a diameter or size ranging from about 10 to about 49 microns.

The present invention also relates to a process for preparing an aqueous pigment ink jet ink composition by: 1) forming a pigment dispersion comprising pigment particles and a dispersant which is a product of an aldehyde and a derivative of naphthalene sulfonate salt; 2) mixing the pigment dispersion with a water soluble solvent or humectant and water; and 3) removing pigment particles greater than 3.0 microns in diameter or size. Optional chemical additives may also be added to the ink jet ink composition. The mixing step (or process) can include sonification, homogenization, high speed mixing, attrition, microfluidization, and combinations thereof. Further, an optional centrifugation step (either a continuous or batch process) can be performed to separate large and unstable pigment particles from the ink jet ink composition, thereby removing pigment particles greater than 3.0 microns, and preferably greater than 1.2 microns. These pigment particles also may be removed from the ink composition by a filtration step (either a continuous or batch process). The above steps in the process of preparing a pigment ink jet ink composition can be performed in any order, so long as the objective of this invention is achieved.

The present invention also relates to the preparation of nontoxic ink jet inks by using pigments with a low polyaromatic hydrocarbon content (e.g. <5 parts per million).

DETAILED DESCRIPTION OF EMBODIMENTS

Aqueous ink jet ink compositions according to the present invention provide numerous benefits including waterfastness, lightfastness, low product cost, high image resolution, excellent print quality on a variety of substrates, excellent jetting capability with high drop velocity, long latency, large drop mass or drop volume which provides optimal optical density in either a single pass or multiple pass method, high frequency response which allows for high speed and high resolution (>360 spi) ink jet printing, excellent printhead recoverability and maintainability, excellent ink stability and very low printhead kogation (undesired printhead heater deposit causing degradation in jetting performance).

The liquid vehicle of the ink jet inks employed in the present invention includes water or a mixture of water and at least one water miscible or soluble organic component, such as a humectant or solvent. The humectants or solvents can be selected from alcohols including methanol, ethanol, isopropanol, butanol, octanol, alkyl alcohols, and the like; diol derivatives such as ethylene glycol, propylene glycol, diethylene glycol, dipropylene glycol, polyethylene glycol, polypropylene glycol, and the like; triol derivatives including glycerine, trimethylolpropane, and hexane triols; diols and triols containing 2 to 15 carbon atoms including 1,5 pentanediol, 1,6 hexanediol, glycerine, trimethylolpropane, 1,2,6-hexanetriol, and the like; reaction products of either ethyleneoxide or propyleneoxide and the aforementioned alcohols, diol derivatives, and triol derivatives; N-alkylpyrrolidinone derivatives (N-methylpyrrolidinone, N-cyclohexylpyrrolidinone, etc.); ethers including glycol ethers such as carbitol, alkylcarbitol (e.g., butylcarbitol), cellusolve, etc.; polyglycolethers including ethers of polethyleneglycol and polypropyleneglycol; carboxylic acids; esters; organosulfides; organosulfoxides including alkylarylsulfoxide (e.g., methylphenylsulfoxide) and dialkylsulfoxide (e.g., dimethylsulfoxide, methylbutylsulfoxide, and the like); sulfone derivatives (organosulfurdioxide) including sulfolane (tetramethylenesulfone), alkylsulfones (e.g., methylsulfolane), dialkylsulfones (e.g., diethylsulfone, ethylmethylsulfone, etc.), alkylarylsulfones (e.g., methylphenylsulfone), and the like; amides (e.g., N,N-dialkyl amide, N,N-alkyl phenyl amide, N-methylpyrrolidinone, N-cyclohexylpyrrolidinone, N,N-diethyltoluamide, etc.); imidazole derivatives including imidazole, alkylimidazoles (e.g. methylimidazole, ethyl imidazole, etc.) and dialkylimidazoles; amino alcohols; ketones; urea; betaine; thio (sulfur) derivatives of the aforementioned materials (e.g., thioethyleneglycol, trithio or dithioethyleneglycol), and other water soluble or miscible materials, as well as mixtures thereof.

When mixtures of water and water soluble organic material (humectants or solvents) are selected as the liquid vehicle in the ink, the water to organic material ratio may be in any effective range, and typically is from about 100:0 to about 50:50, preferably from about 99:1 to about 60:40, although the ratio can be outside these ranges. The non-water component of the material generally serves as a humectant, which has a boiling point higher than that of water (100° C.).

Besides humectants, desired chemical additives, including many penetrants, surfactants, water soluble polymers, pH buffering agents, biocides, chelating agents (EDTA and the like), anti-cockling agents, anti-curl agents, and anti-kogation agents, can also be used in the ink jet ink compositions of this invention. Some examples of the desired additives will be described later. In the inks employed for the ink jet printing process of the present invention, the solvent or humectant is generally present in an amount of from about 0 to about 50 percent by weight, preferably about 0.1 to about 40 percent by weight, and most preferably from about 5 to about 35 percent by weight, although the amount can be outside these ranges.

According to the present invention, it has been discovered that particular solvents and/or humectants in the inks provide exceptionally good decap or long latency time. For example, such solvents include sulfone derivatives (e.g., dialkyl sulfone, alkyl phenyl sulfone, cyclic sulfone derivatives including sulfolane (tetramethylenesulfone), alkylsulfolane (e.g., methylsulfone, ethylsulfone, etc.), and dialkylsulfolane (e.g., methylethylsulfone, diethylsulfone, etc.)); organosulfoxides (e.g., dimethylsulfoxide, alkylphenylsulfoxide, etc.); amide derivatives (e.g., N,N-dialkyl amides, N,N-alkyl phenyl amides, N-alkylpyrrolidinone including N-methylpyrrolidinone, N-cyclohexylpyrrolidinone, and N,N-diethyltoluamide); imidazole derivatives (e.g. imidazole, alkylimidazole, alkoxyimidazole, etc.); imidazolidinone derivatives (e.g., 1,3-dimethylimidazolidone, etc.); betaine; urea derivatives; trihydroxyl derivatives or triols (e.g., trimethylolpropane, glycerine, 1,2,4-trihydroxybutane, 1,2,6-trihydroxyhexane, condensation products of alkyleneoxides (e.g., ethyleneoxide, propyleneoxide, etc.) and triols, etc.); dihydroxyl derivatives or diols (e.g., ethyleneglycol, propyleneglycol, diethyleneglycol, dipropyleneglycol, polypropyleneglycol (MW<8000), and polyethyleneglycol (MW<8000)); and thio (sulfur) derivatives of all the abovementioned materials (e.g., thioethyleneglycol, trithioethyleneglycol, and the like). Reaction products of ethyleneoxide or propyleneoxide and the aforementioned hydroxyl or thiol compounds, such as alcohols, diols, triols, glycols, and their sulfur derivatives, can also be used as solvents or humectants in the ink jet ink compositions of the present invention.

The preferred solvent or humectant is a sulfone derivative, such as sulfolane (tetramethylenesulfone), alkysulfolane (e.g., methylsulfolane, etc.), dialkylsulfones (ethylmethylsulfone, ethylpropylsulfone, ethylbutylsulfone, and the like), and alkylarylsulfones. The solvent or humectant according to the present invention may include sulfolane alone, or sulfolane in combination with other solvents or humectants.

A preferred ink jet ink composition of the invention comprises a sulfone derivative (e.g., sulfolane), water, and a pigment which is either chemically modified (comprising ionizable carboxylate groups, sulfonate groups, phosphate groups, or substituted or unsubstituted ammonium groups) or stabilized by a dispersant comprising at least a product of an aldehyde (e.g., formaldehyde, acetaldehyde, etc.) and a naphthalene sulfonate salt (for example, a naphthalene sulfonic acid salt, an alkyl substituted naphthalene sulfonic acid salt or an alkyl ether substituted naphthalene sulfonic acid salt with various cations, including $Rb^+$, $Cs^+$, $K^+$, $Na^+$, $Li^+$, and substituted and unsubstituted ammonium cations). It is preferred to have pigment particles with a particle size distribution where at least 50% of the said pigment particles have an average diameter or size $\leq 0.3$ micron with the remaining particles in the ink composition having a diameter or size $\leq 3.0$ microns, with a portion of the particles having a diameter or size $\geq 0.1$ micron but $\leq 3.0$ microns. More preferably, the pigment has a particle size distribution where at least 70% of the said pigment particles have an average diameter or size $\leq 0.3$ micron with the remaining particles in the ink jet ink composition having a diameter or size $\leq 1.2$ microns, with a portion of the particles having a diameter or size $\geq 0.1$ micron but $\leq 1.2$ microns. The above preferred ink jet ink composition is particularly useful when using a high resolution thermal ink jet printhead (e.g., printhead >360 spi), wherein the printhead has at least one nozzle opening of a diameter or size ranging from about 10 to about 49 microns. When a sulfone derivative is included in the ink composition, the ink may exhibit a long latency (>10 seconds) in a high resolution printhead.

Preferably, the pigment particles of the ink composition are as small as possible to enable a stable colloidal suspension of the particles in the liquid vehicle and to prevent clogging of the ink channels or nozzle openings while maintaining good color strength when the aqueous ink jet ink is used in an ink jet printer. Preferred pigment particle diameters or sizes are generally from about 0.001 to about 5 microns, and more preferably from about 0.001 to about 3 microns, and most preferably from about 0.001 to about 1.2 microns, although the particle size can be outside these ranges. Although it is easier to stabilize extremely small size pigment particles in an ink composition, a large population of extremely fine pigment particles (e.g. 0.001–0.01 micron) in the ink may not be suitable to provide desired color strength (optical density) for the images on the print substrate. Therefore, proper control of pigment particle size and distribution is needed in ink compositions to obtain both the desired ink stability and color strength.

The amount of sulfone derivative, such as sulfolane, employed in the ink jet ink composition of the present invention may range from 0 to about 50 percent by weight, preferably from about 0.1 to 40 percent by weight, and more preferably from about 5 to 30 percent by weight, although the amount can be outside these ranges. The amount of other solvents or humectants employed together with the sulfone derivative in the ink jet ink composition of the present invention may range from 0 to about 40 percent by weight, preferably from about 1 to about 30 percent by weight, and, most preferably, from about 4 to about 20 percent by weight, although the amount can be outside these ranges. When a sulfone derivative such as sulfolane is not employed in the ink jet ink composition of the present invention, the amount of solvent or humectant in the ink jet ink composition may range from about 1 to about 60 percent by weight, preferably from about 2 to about 50 percent by weight, and more preferably from about 5 to about 40 percent by weight, although the amount can be outside these ranges.

Solvents or humectants other than sulfone derivatives may be selected from diol derivatives such as ethyleneglycol, propyleneglycol, diethyleneglycol, dipropyleneglycol, polyethyleneglycol, polypropyleneglycol, 1,3-propanediol, 1,5-pentanediol, etc.; triol derivatives such as glycerine, trimethylolpropane (TMP), etc.; condensation products of the aforementioned diol and triol derivatives with alkyleneoxides such as ethyleneoxide, propyleneoxide, butyleneoxide, etc.; pyrrolidinone derivatives (e.g., 2-pyrrolidinone, N-methyl pyrrolidinone, N-cyclohexylpyrrolidinone, etc.); betaines; urea; and mixtures thereof.

The colorant for the ink jet ink compositions of the present invention is a pigment, or a mixture of one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow, as well as mixtures thereof. Illustrative examples of magenta pigments include CI Solvent Red 19; Hostaperm® Pink E (American Hoechst); Fanal Pink D4830 (BASF); Cinquasia Magenta (DuPont); Lithol Scarlet D3700 (BASF); Tolidine Red (Aldrich); Scarlet for Thermoplast NSD PS PA (Ugine Kuhlmann of Canada); E. D. Toluidine Red (Aldrich); Lithol Rubine Toner (Paul Uhlich); Lithol Scarlet 4440 (BASF); Bon Red C (Dominion Color Co.); Royal Brilliant Red RD-8192 (Paul Uhlich); Oracet Pink RF (Ciba-Geigy); Paliogen Red 3871K (BASF); Paliogen Red 3340 (BASF); 2,9-dimethyl-substituted quinacridone; anthraquinone, identified in the Color Index as CI 60710; Lithol Fast Scarlet L4300 (BASF); and the like. Illustrative examples of suitable cyan pigments include copper tetra-4-(octadecyl sulfonamido) phthalocyanine; X-metal-free and metal phthalocyanine derivatives, including copper phthalocyanine pigments, listed in the color index as CI 74160, CI Pigment Blue, and Anthradanthrene Blue, (CI 69810), Special Blue X-2137, Hostaperm® Blue, and the like. Illustrative examples of yellow pigments suitable for use in the present invention include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan II, III, and IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF) and Suco-Yellow D1355 (BASF).

Additional suitable commercially available pigment dispersions include the Hostafine® pigments available from Hoechst Celanese Corporation, including Hostafine® Black T, Hostafine® Black TS, Hostafine® Yellow HR, Hostafine® Yellow GR, Hostafine® Red FRLL, Hostafine® Rubine F6B, and Hostafine® Blue B2G; pigment dispersions available from Bayer company including Levanyl® Black A-SF, Levanyl® Yellow 5GXZ-SF, and the like; pigment dispersions available from Degussa Company including Derussol® carbon black pigment dispersions such as Derussol® Z35OS, Derussol® VU 25/L, Derussol® 345, and Derussol® 345OS; pigment dispersions available from BASF Corporation including Novofil® Black, Disperse Black 006607, Luconyl® Yellow 1250, Basoflex Pink 4810, and Luconyl® Blue 7050; pigment dispersions available from Sun Chemical Corporation, including Sunsperse® 9303, Sunsperse® Red RHD 9365, and Sunsperse® Magenta W83012; pigment dispersions derived from chemically modified pigments available from the Cabot company such as the Cab-O-Jet® series (Cab-O-Jet 300, etc.) and Cabot IJX® series; and the like. Other suitable pigments having the criteria set forth below can also be selected. The preferable pigment dispersions include carbon blacks, such as Hostafine® Black (T and TS), Novofil® Black, Sunsperse® 9303, and Levanyl® Black A-SF.

The preferred pigments of this invention are nontoxic and AMES test negative materials which include nonmutagenic and noncarcinogenic pigments for safety reasons. For example, it is desirable to have pigments which have a very low concentration of polyaromatic hydrocarbons, which are known to be carcinogenic or mutagenic. Many polyaromatic hydrocarbons, such as nitropyrene, pyrene, tetracene, pentacene, and many other polyaromatic hydrocarbons in commercial carbon blacks and color pigments are considered to be toxic at a concentration greater than 5 parts per million (ppm). Thus, there is a need to limit the amount of toxic polyaromatic hydrocarbons in the pigments to less than 5 ppm for the preparation of nontoxic ink jet inks. However, many commercial carbon blacks and pigments have a concentration of polyaromatic hydrocarbons exceeding 5 ppm, and, therefore, the inks derived from them are generally considered to be toxic and fail to pass the AMES test. However, many nontoxic carbon blacks and color pigments, including Raven® 5250, Raven® 5750, Regal® 330, Black Pearl® 1300, Black Pearls® L, Vulcan® XC-7, Hostaperm® pink E, Hostaperm® blue (a phthalocyanine derivative), and other pigments, are used in toners and other imaging applications. These pigments usually have a polyaromatic hydrocarbon content of less than 1 ppm and do not show positive response in the AMES test. These pigments are considered to be safe in toner and ink jet ink applications.

The color fidelity (e.g., hue, color gamut, optical density, etc.) of the aforementioned pigments and pigment dispersions can be modified, if necessary, with many known dyes including Food Black No. 1, Food Black No. 2, Direct Black 168, Acid Blue 9, water soluble copper phthalocyanine derivatives including copper phthalocyanine tetrasulfonate sodium salt, Direct Blue 199, Acid red 52, Acid yellow 17, Tartrazine yellow, Projet cyan, Projet magenta, Projet yellow, and the like. However, in this invention, the majority of the color of the ink jet image is contributed from the pigment colorants in the inks.

According to the present invention, the pigment dispersions prepared by the process set forth herein may also be employed in ink jet ink compositions for ink jet printing. Such dispersions for the preparation of pigment ink jet inks are provided by mixing pigment with water and an optional dispersant selected from anionic, cationic, or nonionic dispersants, and mixtures thereof (e.g., anionic and nonionic dispersants, or cationic and nonionic dispersants). The pigment dispersions can be used with desired optional chemical additives, including solvents or humectants, biocides, penetrants, surfactants, polymers, and so forth, to form aqueous ink jet inks of this invention. These ink jet inks comprising a pigment, water, and optional desired chemical additives can be agitated or mixed by any suitable means, including a mechanical or magnetic stirrer, a high speed mixer, an attritor, a homogenizer, a sonificator, a microfluidizer, and the like. The above agitated ink composition can also be optionally centrifuged to remove large or unstabilized particles, especially pigment particles, before filtration. The filtered ink jet inks can then be used in the ink jet printing process of this invention. The removal of large and unstable particles (e.g., >3.0 microns, preferably >1.2 microns) from the ink composition is important to assure the production of a useful ink jet ink which is suitable for use in an ink jet printing process. The removal of large pigment particles is particularly important when using a high resolution ink jet printhead (>360 spi) having at least one nozzle of a diameter or size ranging from about 10 to about 49 microns.

The ink jet ink of the present invention in some cases need not contain a dispersing agent. For example, chemically modified or treated pigments that have at least a water compatible or ionizable functional group(s) selected from carboxylic acid salts, sulfonate salts, phosphate salts, phosphonic acid salts, and mixtures thereof, as well as cationic ammonium salts (including substituted or unsubstituted ammonium salts such as methylammonium salt, trimethylammonium salt, triethylammonium salt, ammonium salt, and the like), can be used without a dispersant. The water compatible or ionizable functional group is attached to the pigment particles after chemical modification to provide desired stability in the ink jet ink. Thus, the chemically modified pigment particles can be easily dispersed in aqueous ink jet inks without a dispersing agent. Some examples of chemically treated or surface treated pigments which are useful in this invention include those described in U.S. Pat. No. 5,281,261 to Lin, and U.S. Pat. No. 4,530,961 to Nguyen et. al. (incorporated by reference), and various known chemically modified carbon black dispersions for ink jet application which are available from Cabot Company, such as the Cab-O-Jet Series or the IJX Series, including those carbon blacks comprising carboxylic acid salts (anionic), sulfonate salts (anionic), and ammonium salts (cationic). If necessary, a dispersant selected from a group of anionic and nonionic dispersants can be added to an ink jet ink comprising the chemically modified pigment particles for improvement of jetting performance and ink stability.

In addition, the colorant for the ink jet ink compositions of the present invention may, in embodiments, be a mixture of one or more pigments as well as pigments which have been modified with at least a dye for color adjustment. The pigments can be either with or without chemical modification. However, if the pigments have not been chemically modified, they should be used in conjunction with a dispersant to assure the proper stabilization of the pigment particles in the ink jet ink of this invention. The pigment may be present in the ink jet ink composition in any effective amount, generally from about 0.1 to about 20 percent by weight, preferably from about 0.1 to about 10 percent by weight, more preferably from about 2.0 to about 9.0 percent by weight, and most preferably from about 2.0 to about 7.0 percent by weight, although the amount can be outside of these ranges.

According to the present invention, a pigment which is not chemically treated or modified is dispersed in one or more dispersants. The dispersants should have both ionic (capable of ionization in water) and hydrophobic (affinity for pigments) moieties. Suitable dispersants include anionic dispersants, such as polymers and copolymers of styrene sulfonate salts (e.g., $Na^+$, $Li^+$, $K^+$, $Cs^+$, $Rb^+$, substituted and unsubstituted ammonium cations, etc.); naphthalene sulfonates salts (e.g., $Na^+$, $Li^+$, $K^+$, $Cs^+$, $Rb^+$, substituted and unsubstituted ammonium cations (e.g., trimethylammonium salt, dimethylammonium salt, ammonium salt, etc.)); and various aldehyde derivatives (e.g., alkyl aldehyde derivatives including formaldehyde, acetaldehyde, propylaldehyde, etc.); and mixtures thereof. Dispersants may include commercial products such as Lomar® D, Daxad® 19, Daxad® K, Tamol® SN, and the like. The more preferable dispersants include reaction products of naphthalene sulfonate salts and aldehyde derivatives, especially reaction (condensation) products of naphthalene sulfonic acid and formaldehyde and its salts (e.g., $Na^+$, $Li^+$, $K^+$, $Cs^+$, $Rb^+$, substituted and unsubstituted ammonium cations, etc.), as well as mixtures thereof. Also, nonionic dispersants or surfactants comprising ethoxylated monoalkyl- or dialkylphenols, including Igepal® CA and CO series materials from Rhone-Poulenc Co., Tamol® Series materials from Rhom and Hass Co., and Triton® series materials from Union Carbide Company, can be used. These nonionic surfactants or dispersants can be used alone or in combination with the aforementioned anionic dispersants. The nonionic dispersants can also be used alone or in combination with one or more cationic dispersants in water.

The ratio of pigment to pigment dispersant according to the present invention ranges from about 1.0/0.01 to about 1.0/3.0, preferably from about 1.0/0.01 to about 1.0/2.0, and most preferably from about 1.0/0.1 to about 1.0/1.0. The amount of naphthalene substituent to aldehyde (e.g., formaldehyde, acetaldehyde, etc.) in the aforementioned anionic dispersant condensation product is generally about 1 to 1, although this ratio can be different depending on the stoichmetry of the feed stock and reaction conditions. The ratio can be readily adjusted to obtain a dispersant having a desired molecular weight and the desired ratio of naphthalene substituent to aldehyde. The remainder of the dispersant may comprise nonactive ingredients such as water, solvent or humectant. The average molecular weight of the dispersant is generally less than 20,000, preferably less than 13,000, and more preferably less than 10,000. The pigment dispersion should contain enough dispersant to stabilize the pigment particles, but not so much as to adversely affect properties of the pigment dispersion or ink, such as viscosity, stability, and optical density.

Other chemical additives can also be present in the ink compositions of the present invention. For example, surfactants or wetting agents can be added to the ink composition. These additives may be anionic, cationic, or nonionic. Suitable surfactants and wetting agents include Tamol SN®, Tamol LG®, those of the Triton® series available from Rohm and Haas Co., those of the Marasperse® series, those of the Igepal® series available from Rhone-Poulenc Co. (formerly from GAF Co.), those of the Tergitol® series available from Union Carbide Corp., those of the Duponol® series available from E.I. duPont de Nemours & Co., Emulphor® ON 870 and ON 877, available from GAF, those of the Surfynol® Series available from Air Products Co., and other commercially available surfactants. These surfactants and wetting agents are present in the ink in effective amounts, generally from 0 to about 10 percent by weight, preferably from 0 to about 8 percent by weight, and more preferably from 0 to about 5 percent by weight, although the amount can be outside these ranges.

Polymeric additives can also be added to the inks employed in the process of the present invention. They include water soluble polymers such as Gum Arabic, polyacrylate salts, polymethacrylate salts, polyvinyl alcohols, hydroxypropylcellulose, hydroxyethylcellulose, polyvinylpyrrolidinone, polyvinylether, starch, polysaccharides, polyethyleneimines derivatized with polyethylene oxide and polypropylene oxide, such as the Discole® series available from DKS International, Tokyo, Japan, the Jeffamine® series available from Texaco, Bellaire, Tex., and the like. Polymeric additives may be present in the ink of the present invention in the amount of from 0 to about 10 percent by weight, preferably from about 0.001 to about 8 percent by weight, and more preferably from about 0.01 to about 5 percent by weight, although the amount can be outside these ranges.

Other optional additives to the inks employed in the process of the present invention include biocides such as Dowcil 150, 200, and 75, benzoate salts, sorbate salts, Proxcel® from ICI, and the like, present in an amount of from 0 to about 10 percent by weight, preferably from about 0.001 to about 8 percent by weight, and more preferably from about 0.01 to about 4.0 percent by weight, although the amount can be outside these ranges; penetration control additives or penetrants such as N-methylpyrrolidinone, sulfoxides, ketones, lactones, esters, alcohols, butyl carbitol, hexyl carbitol, ethoxylated alkyl alcohol derivatives, benzyl alcohol, N-cyclohexylpyrrolidinone, 1,2-hexanediol, glycol ethers, and the like, present in an amount of from 0 to about 40 percent by weight, and preferably from about 0.1 to about 20 percent by weight, although the amount can be outside these ranges; pH controlling agents such as acids or bases, phosphate salts, carboxylates salts, sulfite salts, amine salts, and the like, present in an amount of from 0 to about 10 percent by weight, preferably from about 0.001 to about 5 percent by weight, and more preferably from about 0.01 to about 5 percent by weight, although the amount can be outside these ranges. Other known additives such as anti-cockle, anti-curl, and anti-kogation agents can be employed in the inks of the present invention.

Other examples of suitable ink additives include those disclosed in U.S. Pat. Nos. 5,223,026 and 5,207,825, the disclosures of which are totally incorporated herein by reference.

According to the present invention, pigment dispersions may be prepared by mixing at least one dispersant (e.g., a reaction product of an aldehyde, such as formaldehyde, and naphthalene sulfonate, or a derivative thereof), pigment, and water in a mixer such as an attritor, sandmill, homogenizer, fluidizer, high speed mixer, and the like, with or without an optional grinding medium, such as stainless steel balls, ceramic chips, and the like. Proper pigment to dispersant ratio, as mentioned previously, and optimum grinding time are needed to reduce the particle size of the pigment to provide a suitable pigment dispersion with desired particle size distribution. Grinding or mixing time generally ranges from about 10 minutes to about 24 hours, preferably from about 10 minutes to about 8 hours, and most preferably from about 15 minutes to about 5 hours, depending on the mixing conditions. The pigment dispersion thus obtained may be centrifuged at a speed up to 20,000 rpm and filtered to provide a uniform particle distribution in the ink and to remove unstable larger particles, particularly of pigment. This centrifuge process is optional and the ink may be filtered subsequent to mixing the pigment dispersion with the other ink components. Filtration allows removal of undesired large particles which may clog the channel or nozzle opening.

Aqueous pigment ink jet ink compositions according to the present invention may be fabricated by mixing pigment, pigment dispersants, water, solvent or humectant, and other desired ink additives as described herein. The mixing can be done by various methods including homogenization, attrition, sonification, microfluidization, mechanical mixing, magnetic stirring, high speed mixing, and the like. The agitation (mixing) process involving sonification, homogenization or microfluidization is preferred because such a process provides a uniform dispersion by evenly distributing the pigment particles throughout the dispersant and the ink jet ink composition. Microfluidization can also be used for large scale production of the pigment dispersion and ink composition.

The dispersed pigment mixture can be used as an ink composition, but preferably is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large particles, particularly large pigment particles, from the ink and to provide the desired pigment particle size distribution. Centrifugation should be conducted for a time sufficient to remove large size particles at a rate of about 1,000 to 20,000 rpm. The continuous centrifugation process is very useful in the commercial production of large quantities of pigment ink for the separation of large, unstable particles from the ink.

The ink jet ink is also preferably subjected to a filtration process which utilizes various commercial filtration media of a proper pore size, including cartridges constructed from nylon, polyester, Teflon®, polysulfone, and other suitable polymeric materials; membranes; porous ceramic media; cloth; and the like. The filter should be of a size to remove particles greater than 3.0 microns in size, preferably to remove particles greater than 1.2 microns in size, and most preferably to remove particles greater than 1.0 micron in size. Any suitable filtration method, such as continuous and/or batch filtration, may be used. Continuous filtration methods are preferred for large scale production of pigment inks. Inks which have been centrifuged and filtered so as to preferably remove particles greater than 3.0 microns (or more preferably to remove particles greater than 1.2 microns), and have met the desired pigment particle size distribution as outlined before, are suitable for use as ink jet inks of this invention. They do not clog the printhead nozzles easily and have long latency and jetting stability.

The surface tension of the pigment ink jet inks of the invention is usually greater than 30 dynes/cm, preferably greater than 45 dynes/cm, and more preferably greater than 50 dynes/cm, although it can be outside this range. The viscosity of the ink jet ink is usually less than 20.0 Cps, preferably less than 10.0 Cps, and more preferably less than 5.0 Cps.

The ink jet inks of the present invention possess excellent latency. Generally, the inks possess a latency of at least 10 seconds, more generally on the order of about 20 seconds to greater than 1000 seconds, with a minimum latency of at least 15 seconds being preferred when a 600 spi printhead is employed (e.g., 23 micron diameter or size nozzle opening).

The ink jet inks of this invention may be applied to a suitable print substrate in an imagewise fashion either with or without heating the print substrate. The heating of the print substrate can be carried out at any stage of the ink jet printing process, including before, during, and after printing, or any combination thereof. The heating can be done by any heating means, including radiant heating, heating tape, heating drum or roller, heating lamp, heated platen, and the like. The ink jet printhead used in the printing process can be selected from the group consisting of single printheads, partial-width printheads, and full-width array printheads. High resolution ink jet printheads having at least one nozzle of a diameter or size ranging from about 10 to about 49 microns are preferred for the ink jet printing process in order to produce excellent images on the print substrate, especially plain papers.

Application of the ink jet inks of this invention onto the print substrate can be made by any suitable printing process compatible with the aqueous-based inks, such as flexographic printing, pen plotters, continuous stream ink jet printing, drop-on-demand ink jet printing (including piezoelectric, acoustic, and thermal ink jet processes), or the like. The ink jet ink compositions of this invention are extremely useful in the thermal ink jet printing process. The print substrate employed can be any print substrate compatible with aqueous-based inks, including plain papers, such as Xerox® series 10 paper, Xerox® 4024 paper, commercial bond papers or the like; coated papers (or special ink jet papers), such as those available from Hewlett Packard, Canon, Oji Paper Co., Jujo co., and Xerox Corporation; textiles; special ink jet papers, including silica coated papers and photorealistic ink jet papers; photographic papers; and ink jet transparency materials suitable for aqueous inks or ink jet printing processes, including those from Artright Co., Canon Co., Hewlett Packard, and Xerox Corporation, or the like.

Specific embodiments of the invention will now be described in detail. These examples are intended to be illustrative, and the invention is not limited to the materials, conditions or process parameters set forth in these embodiments. Other embodiments and modifications of the present invention may occur to those skilled in the art subsequent to a review of the information presented herein. These embodiments and modifications, as well as equivalents thereof, are also included within the scope of this invention. All parts and percentages are by weight, unless otherwise indicated.

EXAMPLE I

A carbon black ink dispersion was prepared using 60 g nontoxic Raven® 5250 (polyaromatic content <1 ppm) 15 g Lomar® D (a copolymer of sodium naphthalene sulfonate salt and formaldehyde, 25% by weight of carbon black), and distilled water (total 279.98 g). The carbon black dispersion was mixed using an attritor (Union Process Corp. Model 01 with cooling facility) containing a sufficient amount of ⅛" stainless steel shots (@ 1500 g). The materials were introduced into the attritor portionwise to ensure homogeneous mixing and milled for about ½ hour with good dispersion recovery (399.2 g, 95.55%). The carbon black in the pigment dispersion was about 16.03%. Subsequently, a carbon black ink was prepared by slowly mixing (magnetic stirring) the above carbon black dispersion (26575-102, 78.0 g, about 5% target carbon black content in ink), sulfolane (tetramethylenesulfone, 22.60 g, 9 percent by weight in ink), and distilled water (149.5 g). After sonification of the above ink mixture for 10 minutes, the mixture was centrifuged with a dupont Sorvall centrifuge at a speed of 10,000 r.p.m. for 30 minutes. The ink mixture was filtered through a 3.0 micron membrane filter, a 0.8 micron membrane filter, and a 0.65 micron membrane filter without any difficulty. All pigment particles were less than 0.65 micron and the majority (at least greater than 50%) of them were less than 0.1 micron according to the analytical result. The resulting carbon black ink comprises 4.31% carbon black, 9% sulfolane and water (balance).

EXAMPLE II

The above carbon black ink was modified to yield another carbon black ink. Trimethylolpropane (TMP, 5.687 g) and sulfolane (8.062 g) were heated slightly and mixed thoroughly. The above humectant mixture was added slowly into the carbon black ink obtained in Example I (100 g) with strong magnetic stirring to ensure complete homogeneous mixing without colloidal shock. The resulting ink mixture was adjusted to a pH of 7.20 and filtered through a series of membrane filters (5.0 mm/1.2 mm/0.65 mm) to obtain a carbon black ink which comprised 3.79% carbon black, 15% sulfolane, 5% TMP and water (balance). All pigment particles were less than 0.65 micron and the majority (greater than 50%) of them were less than 0.3 micron according to the analytical result.

The carbon black ink was tested with a 600 spi thermal ink jet printhead having a channel width (nozzle opening diameter) less than 25 microns. Excellent latency (1000 sec.) and jetting frequency response (7–8 KHz) were observed for the above carbon black ink. The ink printed very well with a 600 spi ink jet printhead on various substrates (e.g. plain papers, coated papers, ink jet papers, and transparencies) in a single pass mode with high speed (about 4.33 inch/sec or approximately 17 pages/min.) to form good image quality (sharp edges, optical density=1.05–1.40) and excellent resolution. The pigment ink also produced excellent images on plain papers in a multiple pass printing method (checkerboard method with or without heating the print substrate).

EXAMPLE III

|  | Ink-1 | Ink-2 |
|---|---|---|
| Material (in weight %) | | |
| Levanyl Black A-SF (Bayer) | 20% | — |
| Hostafine Black T (Am. Hoechst) | — | 13.3% |
| Sulfolane | 10% | — |
| Ethylene Glycol | — | 20% |
| Isopropanol | — | 3.5% |
| Polyethylene Oxide | — | 0.03% |
| Water | 70% | 63.17% |
| Properties: | | |
| Viscosity (cPs) | 1.24 | 2.32 |
| Surface Tension (dyne/cm$^2$) | 61.1 | 50.0 |

The above inks were sonified for 20 min. using Sonicator model 350 from Heat Systems-Ultrasonics, Inc. Ink-1 of Example III was centrifuged for 30 min. at 6,000 rpm to further reduce the particle size distribution and remove unwanted large particles. The ink supernatant was then filtered through a 1.20 micron membrane filter to eliminate the large particles (particles >1.2 microns). The inks were then print tested on different printers. Excellent images were obtained on the commercial 300 spi ink jet printers, including the HP 1200C, the HP 500C and the Xerox 4004 Personal Printer. Using a heat-and-delay or heat-and-checkerboard printing method, the ink dried fast and high quality images with an optical density of about 1.3 on many plain papers were obtained. The waterfastness of the print samples is excellent.

EXAMPLE IV

A Xerox 600 spi multi-color thermal ink jet printer and a Xerox 300 spi multi-color thermal ink jet printer both use a multiple pass or checkerboard printing method and heat the print substrate during the printing. These and many other thermal ink jet printers require a highly maintainable, waterfast, high quality ink. The use of a high resolution printhead and an active drier requires an ink with an exceptionally long decap or latency time to prevent clogging the nozzles.

An ink was prepared according to the process of Example III with the following composition:

20% Sulfolane

5% PEG 400

5% carbon black pigment dispersion (17.9% Levanyl A-SF dispersion which contains 28% carbon black pigment)

0.1% Dowicil 200 biocide 0.05% Polyethylene oxide 18.5k

Balance Distilled Water

The ink was tested as above in a Xerox 600 spi printhead with a channel width (or nozzle opening) less than 30 microns. The ink showed excellent latency (>1000 sec), high optical density (>1.3), and a high frequency response (>8 KHz). The pigment ink does not exhibit undesired kogation or degradation of jetting performance after firing 10 million drops. The pigment ink was also printed with a HP 1200C printer to produce a solid area image on plain papers with an optical density of 1.30.

EXAMPLE V

An ink was prepared according to the process of Example III with the following composition:

20% 1,3-dimethylimidazolidone

5% TMP (trimethylolpropane)

7% carbon black pigment dispersion (25% Levanyl A-SF dispersion which contains 28% carbon black pigment)

0.1% Dowicil 200 biocide 0.05% polyethylene oxide

Balance Distilled Water

The ink was tested as above in a Xerox 600 spi printhead and provided excellent latency (>1000 sec), a high frequency response (>7.5 KHz), and no undesired kogation or degradation of jetting performance after firing 10 million drops of ink. The pigment ink was also printed with a HP 1200C printer to produce a solid area image on plain papers with an optical density of 1.30.

EXAMPLE VI

An ink was prepared with the following composition:

20% Sulfolane 5.0% Trimethylolpropane (TMP)

5% carbon black pigment dispersion (17.9% Levanyl A-SF dispersion which contains 28% carbon black pigment)

0.1% Dowicil 200 biocide and

Balance of Distilled Water

The above ink composition was sonified for 20 min. using a Sonicator model 350 from Heat Systems-Ultrasonics, Inc. The ink jet ink composition was centrifuged for 30 min. at 10,000 rpm to further reduce the pigment particle size and its distribution. The ink supernatant was then filtered through a 1.20 micron membrane filter to eliminate the pigment particles larger than 1.2 microns. The ink was then print tested on different printers. Excellent images were obtained on commercial 300 spi ink jet printers including the HP 1200C, the HP 500C, and the Xerox 4004 Personal Printer. Particle size analysis of this ink indicated that about 90% of the pigment particles are less than 0.3 micron and the remaining particles are less than 1.2 microns.

The ink was also tested as above in a Xerox 600 spi printhead with a channel width (or nozzle opening) of less than 30 microns. The ink provided excellent latency (>1000 sec), high optical density (>1.3), a high frequency response (>8 KHz), and did not exhibit undesired kogation or degradation of jetting performance after firing 10 million drops of the ink. The ink was also printed by both single pass and multiple pass printing methods on plain paper with a Xerox ink jet printer equipped with a 600 spi printhead, rendering excellent results.

EXAMPLE VII

Levanyl black A-SF carbon black dispersion (200 g) received from Bayer Co. was agitated (mixed) with a microfluidizer which was set with an inlet pressure of 70 psi and an outlet pressure of 13,000–14,000 psi. After 30 minutes of rapid agitation (or rapid mixing), the pigment dispersion was analyzed by a Horiba CAPA 700 Particle Size Analyzer and shown to have 80.4% by volume of the carbon black particles less than 0.1 micron in size and 93.0% by volume of the carbon black particles less than 0.3 micron in size. Using the processed carbon black dispersion with small pigment particle size, an ink jet ink was prepared to have the following composition:

| | |
|---|---|
| 8.6 g | Levanyl black A-SF Dispersion (after processing) |
| 4.28 g | Sulfolane |
| 17.132 g | Water |

The ink was thoroughly mixed and filtered with a filter having a pore size of 1.2 microns. It was printed with a HP 500C ink jet printer to give good images on plain paper with an optical density of about 1.30.

What is claimed is:

1. A high resolution ink jet printing process for forming an image, comprising:

applying in image-wise fashion to a substrate an aqueous ink composition comprising:

a) a pigment dispersion comprising pigment particles and a dispersant, b) a solvent, and c) water, wherein said aqueous ink composition possesses a latency ≧10 seconds in a printhead having at least one nozzle opening of a diameter or size ranging from about 10 to about 49 microns, wherein said printing process is conducted by an ink jet printhead having a resolution of >360 spi, said printhead being selected from the group consisting of a single printhead, a partial-width printhead and a full-width array printhead, and wherein the pigment particles having a particle size distribution where the particles have an average size or diameter >0.1 micron and at least 50% of said pigment particles have an average diameter or size ≦0.3 micron with the remaining pigment particles having a diameter or size ≦3.0 microns.

2. The process according to claim 1, wherein said pigment is selected from a carbon black and colored pigment and is present in said aqueous ink composition in a concentration ranging from about 0.1 to about 10 percent by weight.

3. The process according to claim 1, wherein said solvent is selected from the group consisting of sulfones; sulfoxides; alcohols; ethyleneglycol; propyleneglycol; diethyleneglycol; dipropyleneglycol; polyethyleneglycol; polypropyleneglycol; trimethylolpropane; 1,5-pentane diol; 1,6-hexane diol; reaction products of either ethyleneoxide or propyleneoxide and a diol or triol; 1,3-dimethylimidazolidone; pyrrolidinone; imidazole; ethers; urea; betaine; thio derivatives of the aforementioned materials; and mixtures thereof.

4. The process according to claim 1, wherein said image has an optical density of ≧1.0 in one application of said aqueous ink composition.

5. The process according to claim 1, wherein said dispersant is a reaction product of an aldehyde and a naphthalene sulfonate salt.

6. A process according to claim 3, wherein said sulfone solvent is tetramethylenesulfone (sulfolane).

7. The process according to claim 1, wherein the pigment particles have a particle size distribution where at least 70% of said pigment particles have an average diameter or size ≦0.3 micron with the remaining pigment particles having a diameter or size ≦1.2 microns.

8. The process according to claim 3, wherein said solvent is an alcohol selected from the group consisting of methanol, ethanol, isopropanol, and butanol.

9. The process according to claim 3, wherein said solvent is selected from the group consisting of sulfone and sulfoxide.

10. The process according to claim 9, wherein said sulfone solvent is selected from the group consisting of tetramethylenesulfone, methyl tetramethylenesulfone and mixtures thereof.

11. The process according to claim 1, wherein the pigment is a chemically modified pigment comprising a water ionizable group selected from the group consisting of carboxylic acid salts, sulfonic acid salts, phosphate salts, phosphoric acid salts, mixtures thereof, and cationic ammonium salts.

* * * * *